R. H. WHITE.
AUTOMOBILE RADIATOR SUPPORT.
APPLICATION FILED MAR. 6, 1912.
1,087,519.
Patented Feb. 17, 1914.
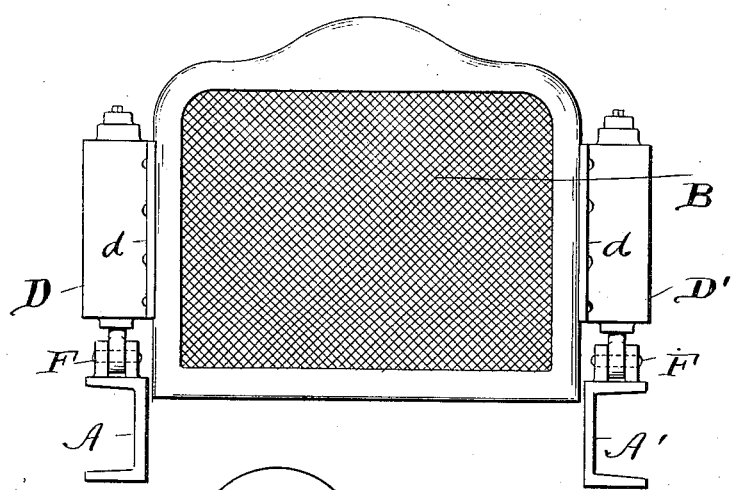
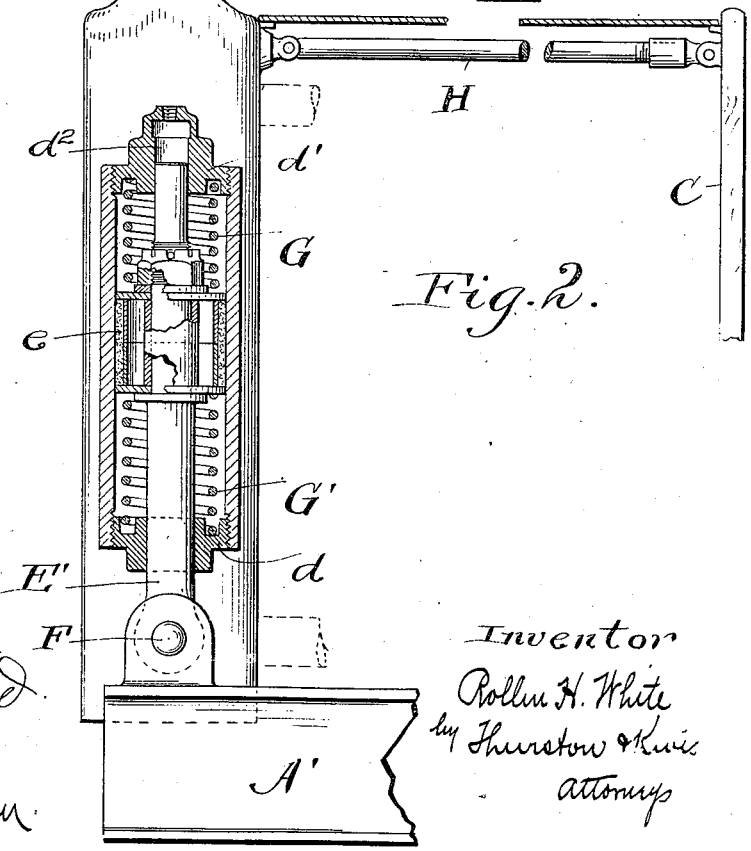

UNITED STATES PATENT OFFICE.

ROLLIN H. WHITE, OF CLEVELAND HEIGHTS VILLAGE, OHIO, ASSIGNOR TO THE WHITE COMPANY, OF CLEVELAND, OHIO, A CORPORATION OF OHIO.

AUTOMOBILE RADIATOR-SUPPORT.

1,087,519.  Specification of Letters Patent.  Patented Feb. 17, 1914.

Application filed March 6, 1912. Serial No. 681,954.

*To all whom it may concern:*

Be it known that I, ROLLIN H. WHITE, a citizen of the United States, residing at Cleveland Heights Village, in the county of Cuyahoga and State of Ohio, have invented a certain new and useful Improvement in Automobile Radiator-Supports, of which the following is a full, clear, and exact description.

This invention is a shock absorbing connection between the frame of an automobile and the radiator thereof, the object being to prevent the jars and strains to which the frame is subjected in use, from being injuriously transmitted to the radiator or its supports, while at the same time holding the radiator always in proper working position.

The invention consists in the construction and combination of parts hereinafter described and pointed out definitely in the claims.

In the drawing Figure 1 is a front elevation of an automobile frame and a radiator connected therewith according to the present invention. Fig. 2 is a sectional side elevation, the section being taken through one of the devices which connect a side of the radiator with the automobile frame.

Referring to the parts by letters, A, A' represent the two longitudinal side members of an automobile frame.

B represents the radiator which may be of any desired shape or construction.

C represents the dash which, it will be understood, is rigidly fixed to the automobile frame. It has not been thought necessary to show more than a part of this dash, because it is a part of practically every automobile.

D, D' represent two cylinders which are rigidly fastened in upright positions to the sides of the radiator by suitable means, as, for example, bolts which engage vertical flanges $d$ formed on said cylinder.

E, E' represent piston rods which at their lower ends are respectively connected to the side frame members A, A' near the front ends thereof, preferably by means of alined transverse horizontal pivots F. Each of these rods extends in a substantially vertical direction upward into one of the cylinders, passing freely through a hole in the lower head $d$ of the cylinder and passing into and being freely movable in an alined hole in the upper head $d'$ of the cylinder. On each of said rods within the associated cylinder is a piston $e$ which must fit the cylinder in such wise that, while the cylinder and piston may be moved relatively, there is sufficient friction between them to prevent them from having any considerable freedom of motion. This construction is in effect a friction dash pot, which, while permitting relative movement up and down of the radiator and automobile frame, prevents rapid movement, and specifically prevents any such vibration up and down as might otherwise take place as the result of the action of the springs G, G, which yieldingly oppose motions of the radiator up or down.

In each cylinder are two slightly compressed coil springs G, G', one lying between the piston and the upper head $d'$, of the cylinder, and one lying between the piston and the lower head $d$ of the cylinder. These springs yieldingly oppose relative movement between the piston and cylinder, but they absorb in a very large degree the shock and jar on the automobile frame which tends to produce such relative movement. Both of the heads $d$, $d'$ screw into the ends of the cylinder and the upper head $d'$ has a hole $d^2$ through which oil may be introduced into the cylinder.

In order to hold the radiator in a substantially upright position a strut rod H is pivoted at its front end to the radiator near the top thereof and is pivoted at its near end to the dash,—both pivots being horizontal and transversely extended.

With the construction shown the radiator will not have any jiggling, rebounding movement, and yet it will be permitted to move relatively to the automobile frame slightly but sufficiently to prevent any substantial injury to it.

Having described my invention, I claim:

1. The combination of an automobile frame and a radiator, with two shock absorbing connections between the frame and the opposite sides of the radiator, each shock absorbing connection including two springs which respectively oppose up and down movement of the radiator relative to the frame, and a friction dash pot which while permitting relative movement between the radiator and frame prevents rapid vibratory motion.

2. The combination of an automobile frame, and a radiator, with two shock absorbing connections between them, each consisting of a substantially vertical cylinder which is fixed to one side of the radiator, a substantially vertical rod which is connected to the automobile frame and which extends upward into the associated cylinder, each rod having within its cylinder an enlarged piston which frictionally fits the cylinder, and two springs in each cylinder which yieldingly oppose relative motion of the cylinder and piston.

3. The combination of an automobile frame, and a radiator, with two shock absorbing connections between them consisting of two substantially vertical cylinders which are fixed to the sides of the radiator, two substantially vertical rods which are pivoted on transverse horizontal alined pivots connected to the automobile frame and which extend upward into the two cylinders respectively, each rod having within the cylinder an enlarged piston which frictionally fits within the cylinder, two springs in each cylinder which yieldingly oppose relative motion of the cylinders and pistons, and a strut rod connected at its ends with the radiator and with some member which is fastened to the automobile frame.

In testimony whereof, I hereunto affix my signature in the presence of two witnesses.

ROLLIN H. WHITE.

Witnesses:
 H. R. SULLIVAN,
 E. B. GILCHRIST.